(12) United States Patent
Kokkinen et al.

(10) Patent No.: US 10,237,775 B1
(45) Date of Patent: Mar. 19, 2019

(54) METHOD AND SYSTEM FOR PRESENTING GEOGRAPHICAL RADIO RESOURCE USAGE INFORMATION IN USER INTERFACE

(71) Applicant: Fairspectrum Oy, Espoo (FI)

(72) Inventors: Heikki Kokkinen, Helsinki (FI); Jaakko Ojaniemi, Turku (FI); Arto Kivinen, Turku (FI); Risto Wichman, Helsinki (FI)

(73) Assignee: FAIRSPECTRUM OY, Espoo (FI)

( * ) Notice: Subject to any disclaimer, the term of this patent is extended or adjusted under 35 U.S.C. 154(b) by 0 days.

(21) Appl. No.: 15/816,054

(22) Filed: Nov. 17, 2017

(51) Int. Cl.
- *H04W 16/14* (2009.01)
- *H04W 72/12* (2009.01)
- *H04B 7/08* (2006.01)
- *H04W 24/10* (2009.01)

(52) U.S. Cl.
CPC .......... *H04W 24/10* (2013.01); *H04W 16/14* (2013.01)

(58) Field of Classification Search
CPC ....... H04W 24/10; H04W 16/14; H04W 4/02; H04W 4/029; H04W 52/0258; H04W 52/288; H04W 72/1263; H04B 7/0834; H04B 7/18556; H04B 17/23; H04M 1/27455; H04M 1/576; H04M 1/72572
See application file for complete search history.

(56) References Cited

U.S. PATENT DOCUMENTS

| | | | |
|---|---|---|---|
| 7,460,837 B2 | 12/2008 | Diener | |
| 7,958,041 B2 | 6/2011 | Stanforth et al. | |
| 8,521,636 B2 | 8/2013 | Chang | |
| 8,532,041 B1* | 9/2013 | Lambert | H04W 72/0406 370/329 |
| 2004/0087310 A1 | 5/2004 | Williamson et al. | |
| 2004/0185858 A1 | 9/2004 | Fattouch et al. | |
| 2009/0262699 A1* | 10/2009 | Wengerter | H04L 1/0072 370/330 |
| 2010/0105400 A1 | 4/2010 | Palmer | |
| 2010/0105408 A1 | 4/2010 | Palmer et al. | |
| 2012/0008525 A1* | 1/2012 | Koskinen | H04W 28/22 370/253 |
| 2015/0189665 A1* | 7/2015 | Sun | H04W 16/14 370/329 |
| 2016/0014613 A1 | 1/2016 | Ponnampalam et al. | |

(Continued)

*Primary Examiner* — Andrew Wendell

(74) *Attorney, Agent, or Firm* — Ziegler IP Law Group, LLC

(57) ABSTRACT

Disclosed is a method for presenting geographical radio resource usage information in a user interface. The method includes receiving radio resource reservation data including location, time and frequency information stored in an administrative spectrum management system. Furthermore, the method includes selecting at least one area of interest and receiving an input indicating a time period of interest from a user. Moreover, the method includes dividing the at least one area of interest into a plurality of subareas. The method includes calculating for each subarea of the plurality of subareas within the at least one area of interest, a first utilization rate of radio resource over the time period of interest. Furthermore, the method includes defining a color for each subarea based on the calculated first utilization rate. Moreover, the method includes rendering the plurality of subareas with the defined color as a geographical map on the user interface.

19 Claims, 7 Drawing Sheets

(56) References Cited

U.S. PATENT DOCUMENTS

2016/0100320 A1    4/2016  Dayanandan et al.
2016/0234858 A1*   8/2016  Bao ..................... H04W 72/12
2016/0316422 A1*  10/2016  Regan ................. H04W 48/16
2017/0257866 A1*   9/2017  Chaudhuri ........ H04W 72/0453
2018/0192441 A1*   7/2018  Yang ................... H04W 16/14

* cited by examiner

METHOD AND SYSTEM FOR PRESENTING GEOGRAPHICAL RADIO RESOURCE USAGE INFORMATION IN USER INTERFACE

TECHNICAL FIELD

The present disclosure relates generally to representation of information; and more specifically, to representation of radio resource usage information.

BACKGROUND

Generally, with advancements in technology, people are becoming more reliant on electromagnetic spectrum for a multitude of reasons. For example, mass media is distributed via cellular, broadcast, and satellite networks that employ radio frequency spectrum. Furthermore, several wireless technologies including Bluetooth, WiFi and infrared are dependent on the electromagnetic spectrum for functioning, such as, for providing telecommunication and/or for distribution of information. Moreover, the electromagnetic spectrum is being increasingly utilized in areas like public safety, national security, medical science (such as in wireless medical devices) and so forth.

However, the electromagnetic spectrum is a limited resource. In earlier days, distribution and use of spectrum resources (or radio resources) was relatively easy, owing to a small number of uses thereof. However, with an increase in use of the electromagnetic spectrum in different areas, a need therefor has increased manifold. Such a need can be partially addressed by more efficient use of available radio resources, such as, by spectrum sharing. Spectrum sharing refers to simultaneous usage of unused radio resources (such as specific radio frequency bands) associated with a radio network, by users of another radio network within a specific geographical area. Furthermore, this can be achieved using a spectrum management entity that helps to improve spectrum usage efficiency and quality of service (QoS) for the users of the different networks operating in a shared spectrum environment.

Usually, for reservation of radio resources in a shared spectrum environment, a significant amount of information is required to be presented to all entities operating therein. For example, an entity providing their spectrum resources for sharing may require information associated with number of users using their radio resources, frequency bands that are reserved by the users, locations associated with such reservations, time period of reservation and suchlike. Moreover, the users using the shared radio resources will require information associated with availability of the radio resources for sharing, such as a location of available radio resources, time period of such availability, frequency bands that are available for sharing, radio resources that have been already been used, and so forth. Therefore, such information is needed to be presented to a plurality of entities for easy visualization and convenient consumption thereof. However, presentation of such information associated with several variables encompassing different domains such as time, location, frequency and so forth becomes a challenging task, especially when the information is required to be presented in a static, 2-dimensional medium (such as a single display screen or a printed page).

Therefore, in light of the foregoing discussion, there exists a need to overcome the aforementioned drawbacks associated with representation of radio resource usage information.

SUMMARY

The present disclosure seeks to provide a method for presenting geographical radio resource usage information in a user interface. The present disclosure also seeks to provide a system for presenting geographical radio resource usage information in a user interface. The present disclosure seeks to provide a solution to the existing problem of representing location-specific as well as time-variant radio resource usage information. An aim of the present disclosure is to provide a solution that overcomes at least partially the problems encountered in prior art, and provides a method and a system for displaying time-variant radio resource usage information associated with a geographical area.

In one aspect, an embodiment of the present disclosure provides a method for presenting geographical radio resource usage information in a user interface, the method comprising:
  receiving radio resource reservation data including location, time and frequency information representing geographical radio resource reservation data stored in an administrative spectrum management system;
  selecting at least one area of interest from a user, wherein the at least one area of interest corresponds to a geographical area;
  receiving an input indicating a time period of interest from the user;
  dividing the at least one area of interest into a plurality of subareas;
  calculating for each subarea of the plurality of subareas within the at least one area of interest, a first utilization rate of radio resource over the time period of interest;
  defining a color for each subarea of the plurality of subareas based on the calculated first utilization rate; and
  rendering the plurality of subareas with the defined color as a geographical map on the user interface.

In another aspect, an embodiment of the present disclosure provides a system for presenting geographical radio resource usage information in a user interface, the system comprising:
  a controller configured to receive radio resource reservation data including location, time and frequency information representing geographical radio resource reservation data stored in an administrative spectrum management system;
  a display screen adapted to include the user interface and receive an input indicating selection of at least one area of interest from a user, wherein the at least one area of interest corresponds to a geographical area;
  wherein the controller is further configured to:
  receive an input indicating a time period of interest from the user;
  divide the at least one area of interest into a plurality of subareas;
  calculate for each subarea of the plurality of subareas within the at least one area of interest, a first utilization rate of radio resource over the time period of interest;
  define a color for each subarea of the plurality of subareas based on the calculated first utilization rate; and
  render the plurality of subareas with the defined color as a geographical map on the user interface.

Embodiments of the present disclosure substantially eliminate or at least partially address the aforementioned problems in the prior art, and provides a simple, convenient and user-friendly method and system for representation of location-specific and time-variant radio resource usage information.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

Figure 1:
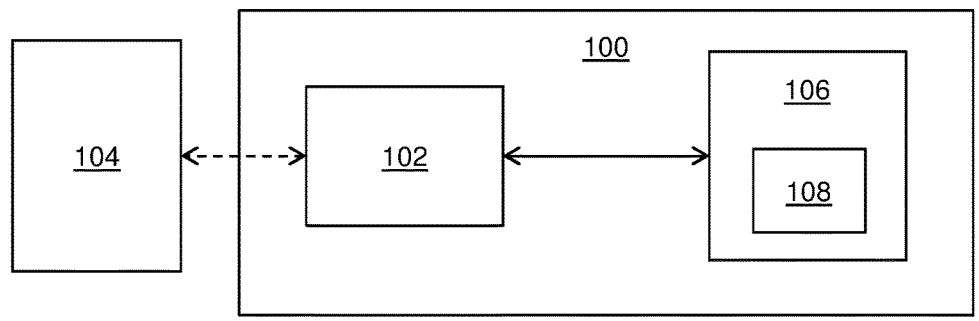
FIG. 1 is a block diagram of a system for presenting geographical radio resource usage information in a user interface, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In one aspect, an embodiment of the present disclosure provides a method for presenting geographical radio resource usage information in a user interface, the method comprising:
receiving radio resource reservation data including location, time and frequency information representing geographical radio resource reservation data stored in an administrative spectrum management system;
selecting at least one area of interest from a user, wherein the at least one area of interest corresponds to a geographical area;
receiving an input indicating a time period of interest from the user;
dividing the at least one area of interest into a plurality of subareas;
calculating for each subarea of the plurality of subareas within the at least one area of interest, a first utilization rate of radio resource over the time period of interest;
defining a color for each subarea of the plurality of subareas based on the calculated first utilization rate; and
rendering the plurality of subareas with the defined color as a geographical map on the user interface.

In another aspect, an embodiment of the present disclosure provides a system for presenting geographical radio resource usage information in a user interface, the system comprising:
a controller configured to receive radio resource reservation data including location, time and frequency information representing geographical radio resource reservation data stored in an administrative spectrum management system;
a display screen adapted to include the user interface and receive an input indicating selection of at least one area of interest from a user, wherein the at least one area of interest corresponds to a geographical area;
wherein the controller is further configured to:
receive an input indicating a time period of interest from the user;
divide the at least one area of interest into a plurality of subareas;
calculate for each subarea of the plurality of subareas within the at least one area of interest, a first utilization rate of radio resource over the time period of interest;
define a color for each subarea of the plurality of subareas based on the calculated first utilization rate; and
render the plurality of subareas with the defined color as a geographical map on the user interface.

The present disclosure provides the method and system for presenting geographical radio resource usage information in a user interface by using geographical radio resource reservation data stored in the administrative spectrum management system. Such radio resource reservation data is generally stored in the administrative spectrum management system in an unfiltered form (or as raw data). The method and system enable graphical representation of such raw data, for example, as a heat map. Furthermore, such a heat map represents utilization rates of radio resource over a geographical area using various colors. It will be appreciated that such representation of the utilization rates of radio resource reservation data enables easy visualization and consequently, convenient and user-friendly analysis of the radio resource reservation data associated with the geographical area. Moreover, presentation of a graph providing time-variant information associated with radio resource reservation data along with the geographical map enables to provide location-specific information as well as time-variant information associated with radio resource usage over the geographical area. Such a presentation of the radio resource usage information enables convenient and uncomplicated presentation of the information in a 2-dimensional space. Moreover, the method and system enable to easily provide a large amount of information in a limited space (such as on a user interface associated with a display screen or a printed page) by graphical rendering of the radio resource reservation data.

The term "radio resource usage information" as used throughout the present disclosure, relates to usage information of an incumbent radio network's specific radio frequency bands (or radio resources) that are licensed for use by one or more licensee radio networks (such as devices associated with the one or more licensee radio networks). The incumbent radio network's radio frequency bands are licensed for use by the one or more licensee radio networks under a set of pre-defined limits, including but not limited to, geographical limits, time limits, number of users, priority rules and so forth. Consequently, the usage information comprises information of geographical area, time period of usage, number of users, specific frequency bands that are licensed for use, information about priority rules and so forth.

Furthermore, when the incumbent radio network's specific frequency bands are licenced for use by devices associated with one or more licensee radio networks, users of devices associated with the licensee radio networks are operable to share the frequency bands with one or more users of the incumbent radio network. Moreover, the incumbent radio network and the one or more licensee radio networks may be associated with commercial entities (such as one or more business entities), non-commercial entities, government entities (such as a defence sector associated with the government), and so forth.

The incumbent radio network's radio frequency bands (referred to as "radio resources" hereinafter throughout the present disclosure) may be licensed for use by the one or more licensee radio networks under a specific resource-sharing regime, such as under a Licensed Shared Access (LSA)/Authorized Shared Access (ASA) spectrum sharing regime, a Television White Space (TVWS) access regime, a Citizens Broadband Radio Service (CBRS) spectrum sharing regime, a capacity sharing regime, a priority sharing regime, an infrastructure sharing regime and suchlike.

The method for presenting geographical radio resource usage information in a user interface comprises receiving radio resource reservation data including location, time and frequency information representing geographical radio resource reservation data stored in an administrative spectrum management system. The term "radio resource reservation data" relates to raw data associated with usage of radio resources associated with an incumbent radio network, by devices associated with one or more licensee radio networks. Such radio resource reservation data is stored by the administrative spectrum management system. The term "administrative spectrum management system" as used herein, relates to an authority that is responsible for enabling the sharing of radio resources between the incumbent radio network and the one or more licensee radio networks, by administering rules and/or protocols that enable reservation, sharing, access and/or optimization of radio resources. Furthermore, the administrative spectrum management system includes a database (referred to as a "reservation data unit" hereinafter) comprising the radio resource reservation data associated with a plurality of incumbent radio networks and a plurality of licensee radio networks.

The user interface is associated with a device, for example, a portable communication device including a smartphone, a laptop computer, a tablet computer and so forth, or alternatively, a fixed device such as a personal computer. Furthermore, such a device includes a display screen for presenting the user interface to a user of the device. Optionally, the display screen is operable to receive inputs from the user, for example, the display screen is implemented using a touchscreen. Moreover, the device comprises a controller that is communicatively coupled with the administrative spectrum management system. For example, the controller (or the device) is communicatively coupled with the administrative spectrum management system using a wired or wireless connection, including but not limited to, the Internet, Local Area Networks (LANs), Wireless Local Area Networks (WLANs), Metropolitan Area Networks (MANs), Wireless Metropolitan Area Networks (WMANs), second generation (2G) telecommunication networks, third generation (3G) telecommunication networks, fourth generation (4G) telecommunication networks, Worldwide Interoperability for Microwave Access (WiMAX) networks and suchlike.

The controller is operable to communicate with the administrative spectrum management system to receive radio resource reservation data including location, time and frequency information representing geographical radio resource reservation data stored in the reservation data unit. In one example, the controller (and the device) is associated with an entity (such as a business entity) of the incumbent radio network. In such an example, the controller is operable to receive radio resource reservation data including location, time and frequency information representing geographical radio resource reservation data associated with the incumbent radio network, stored in the administrative spectrum management system.

According to an embodiment, the radio resource reservation data is received from at least one of a national or a regional radio communication agency. In one example, the administrative spectrum management system is associated with a national radio communication agency, such as Federal Communication Commission (FCC). In such an example, the radio resource reservation data received from the administrative spectrum management system enables to determine spectrum resources available for sharing between two or more radio networks, such as an incumbent radio network and one or more licensee radio networks within a same geographical area. Furthermore, the administrative spectrum management system is configured to operate as a Spectrum Access System (SAS) in Citizens Radio Broadband Service (CBRS) for reservation of radio resources in a 3.5 GHz frequency band. In another example, the administrative spectrum management system is associated with a regional radio communication agency, such as a radio communication agency comprising a geolocation database. In such an example, the controller is operable to communicate with the administrative spectrum management system for reservation of terrestrial television network spectrum resources in a Television White Space (TVWS) network. In yet another example, the administrative spectrum management system is associated with a LSA Repository or a LSA Controller in Licensed Shared Access (LSA). In such an example, the controller is operable to communicate with the administrative spectrum management system for radio resource reservation in a LTE or 5G frequency band. Optionally, when devices associated with licensee radio networks are required to share radio resources with an incumbent radio network, the radio resource reservation data received from the administrative spectrum management system enables to determine radio resources that are available for sharing between the incumbent radio network and the licensee radio network (for example, within a same geographical area).

Optionally, the radio resource reservation data is filtered based on one or more parameters before receiving thereof from the administrative spectrum management system. In one embodiment, the received radio resource reservation data comprises two or more radio resource reservations. For example, the radio resource reservation data is filtered to receive only the radio resource reservation data that is associated with more than two radio resource reservations. Subsequently, the filtered radio resource reservation data is received from the administrative spectrum management system by the controller. In another embodiment, the received radio resource reservation data comprises all radio resource reservations. For example, unfiltered data comprising all radio resource reservations within a geographical area are received from the administrative spectrum management system by the controller.

The method comprises selecting at least one area of interest from a user, wherein the at least one area of interest corresponds to a geographical area. The radio resource usage information received from the administrative spectrum management system may comprise radio resource usage information of an extended geographical area. However, the user (such as the entity associated with the incumbent radio network) requires radio resource usage information of a specific geographical area (such as a city, a town, a state, a district, an area around a location and suchlike). In such an instance, the user is operable to specify the geographical area (or the at least one area of interest) using the user interface associated with the device. For example, the user uses the display screen implemented as a touchscreen, to select the area of interest on a map displayed on the user interface. Furthermore, such selection of the area of interest by the user enables filtering of the radio resource usage information presented on the user interface to within the area of interest.

The method comprises receiving an input indicating a time period of interest from the user. The radio resource usage information received from the administrative spectrum management system may relate to an extended period of time, such as a month, a quarter, a year and so forth. In such an instance, the input indicating the time period of interest enables the radio resource usage information to be filtered to within the time period of interest. The user specifies the time period of interest using the user interface (such as using the display screen implemented as a touchscreen). For example, the user specifies the time period of interest using a drop-down menu presented on the user interface to specify two time points (such as a start time and an end time). Subsequent to such specification of the two time points, the radio resource usage information is filtered to include only the radio resource usage information falling between the two time points (or the time period of interest).

The method comprises dividing the at least one area of interest into a plurality of subareas. The area of interest may be associated with an irregular shape, for example, due to an irregular boundary associated with a periphery of the area of interest. In such an instance, the area of interest is divided into the plurality of subareas such that each of the plurality of subareas is associated with a regular boundary (for example, a polygon). It will be appreciated that such division of the area of interest into the plurality of subareas enables convenient analysis of the radio resource usage information associated with the area of interest. For example, the area of interest is a city and the received resource usage information is associated with two licensee radio networks. Furthermore, the radio resource usage information associated with each of the two licensee radio networks intersects over a portion of the city. In such an example, division of the area of interest into a plurality of subareas enables convenient analysis of the intersecting radio resource usage information associated with each of the two licensee radio networks.

In one embodiment, dividing the at least one area of interest into the plurality of subareas comprises generating a polygon overlay based on intersections of the reservations to create geographical data for the geographical area, and performing an analysis of the geographical data corresponding to the at least one area of interest to divide the at least one area of interest into the plurality of subareas. For example, the area of interest is a town having an area of $10 \times 10$ km$^2$ and the radio resource usage information received from the administrative spectrum management system comprises reservations by a plurality of licensee radio networks. Furthermore, such reservations intersect over various portions of the geographical area of the city, wherein such portions are associated with an area less than or equal to $0.1 \times 0.1$ km$^2$ (the geographical data). In such an instance, based on the geographical data, the area of interest is divided into 10,000 polygons, for example, into 10,000 squares, wherein each square (or subarea) is associated with an area of $0.1 \times 0.1$ km$^2$. However, it will be appreciated that the polygon overlay may comprise polygons associated with a different shape, such as hexagons, and also, a size and a number of polygons within the polygon overlay may differ based on size and/or shape of the area of interest.

The method comprises calculating for each subarea of the plurality of subareas within the at least one area of interest, a first utilization rate of radio resource over the time period of interest. For example, the area of interest is a city comprising a plurality of subareas and the radio resource usage information is associated with a licensee radio network. In such an example, a time period of radio reservation by the licensee radio network for each subarea of the plurality of subareas is calculated. Subsequently, the first utilization rate of radio resource for each of the plurality of subareas is calculated as a ratio of the time period of radio reservation and the time period of interest. In one example, the area of interest comprises three subareas and the time period of interest is 10 hours. Furthermore, a time period of radio reservation for a first subarea of the three subareas is three hours, for a second subarea of the three subareas is five hours and for a third subarea of the three subareas is two hours. In such an example, the first utilization rate of radio resource over the first subarea is 3/10 or 0.3, over the second subarea is 5/10 or 0.5 and over the third subarea is 2/10 or 0.2.

According to one embodiment, the method comprises computing for each subarea of the plurality of subareas, a summed time duration of active radio reservations and dividing the summed time duration with the time period of interest. For example, the radio resource usage information is associated with a plurality of licensee radio networks (such that each of the licensee radio networks license radio frequency bands from an incumbent radio network). In such an example, the calculation of the first utilization rate of radio resource over the time period of interest comprises summing of all time periods that are associated with active radio reservations for the plurality of licensee radio networks for each of the plurality of subareas during the time period of interest. Subsequently, the summed time periods for each of the plurality of subareas are divided by the time period of interest to obtain the first utilization rate of radio resource for each of the plurality of subareas. In one example, the at least one area of interest is associated with a city comprising 50 subareas and the time period of interest is 24 hours (or one day). In such an example, a first subarea is associated with an active radio reservation for 8 hours. Furthermore, the first utilization rate of radio resource over the time period of interest for the first subarea is 8/24 or 0.33. Similarly, a second subarea is associated with an active radio reservation for 13 hours, such as for a time period of 5 hours by one licensee radio network and for a time period of 8 hours by another licensee radio network, wherein the time periods are separated by a gap therebetween. In such an instance, the first utilization rate of radio resource for the second subarea is 13/24 or 0.54. It will be appreciated that a sum of first utilization rates of radio resource over the time period of interest for each subarea of the plurality of subareas will always be less than or equal to one.

The method comprises defining a color for each subarea of the plurality of subareas based on the calculated first utilization rate. The first utilization rate is divided into a plurality of subsets and a unique color is assigned for each of the plurality of subsets. In one embodiment, defining the color for each subarea of the plurality of subareas based on the calculated first utilization rate further comprises defining a first color when the first utilization rate is greater than 0 and lesser than or equal to 1/3 of the highest utilization rate; defining a second color when the utilization rate is greater than 1/3 and lesser than or equal to 2/3 of the highest utilization rate; and/or defining a third color when the utilization rate is greater than 2/3 of the highest utilization rate. For example, the at least one area of interest comprises 50 subareas and 10 subareas are associated with the first utilization rate 0. In such an example, the first color (for example a green color) is defined for each of the 10 subareas. Furthermore, 5 subareas of the 50 subareas are associated with the first utilization rate of 0.4, 6 subareas are associated with the first utilization rate of 0.6 and 22 subareas are associated with the first utilization rate of 0.75. In such an instance, the second color (for example a yellow color) is defined for each of the 11 subareas (5 and 6 subareas having the first utilization rates 0.4 and 0.6, respectively). Moreover, the third color (for example a red color) is defined 22 subareas, associated with the first utilization rate of 0.75. Additionally, each of the 7 remainder subareas of the 50 subareas is associated with the first utilization rate of more than 0.8 and consequently, the third color (i.e the red color) is defined for such 7 remainder subareas. It will be appreciated that a different shade (or gradient) of color may be defined based on the first utilization rate of each of the subarea. For example, when the first utilization rate is further divided into multiple range segments, particularly, more than three range segments (i.e. 0 and lesser than or equal to 1/3 of the highest utilization rate, greater than 1/3 and lesser than or equal to 2/3 of the highest utilization rate, and greater than 2/3 of the highest utilization rate). In such instance, more than three colors (i.e. green, yellow and red colors) may be used for defining such subareas based on the multiple range segments of the first utilization rate.

The method comprises rendering the plurality of subareas with the defined color as a geographical map on the user interface. In one example, the polygon overlay comprising a plurality of polygons of different defined colors based on the first utilization rates of the plurality of subareas, is overlaid (or superimposed) on a geographical map of the at least one area of interest. Such a geographical map comprising the polygon overlay overlaid thereon represents a 'heat map' of the area of interest, wherein the heat map is associated with the first utilization rates of radio resource over the plurality of subareas. For example, the subareas associated with the green color (as described hereinabove) are associated with low first utilization rates, the subareas associated with the yellow color are associated with intermediate first utilization rates and the subareas associated with the red color are associated with high first utilization rates.

According to an embodiment, the method comprises dividing the time period of interest into a plurality of time moments and computing for each time moment of the plurality of time moments, a second utilization rate of radio resource reservation data over the at least one area of interest. For example, the time period of interest is one day (or 24 hours) and each of the plurality of time moments is associated with one hour. In such an example, a number of subareas comprising active radio reservations are determined for each time moment of the plurality of time moments. Subsequently, the number of subareas is divided by a total number of subareas for each time moment, to obtain the second utilization rate of radio resource reservation data over the area of interest and the time period of interest. In one example, the area of interest comprises 1000 subareas, the time period of interest is one day and each of the plurality of time moments are associated with one hour. Furthermore, a first time moment has active radio reservations over 50 subareas of the 1000 subareas. In such an instance, the second utilization rate of radio resource reservation data for the first time moment is 50/1000 or 0.05. Similarly, a ninth time moment has active radio reservations over 185 subareas of the 1000 subareas. In such an instance, the second utilization rate of radio resource reservation data for the ninth time moment is 185/1000 or 0.185. It will be appreciated that the second utilization rate of radio resource reservation data for each time moment of the plurality of time moments will always be less than or equal to one.

In one embodiment, the method comprises rendering the second utilization rate as a function of time on the user interface. For example, the second utilization rates for all time moments are rendered as a graph (or a timeline) over the entire time period of interest. In one example, the time period of interest is represented on a horizontal axis (or abscissa) of the graph and the second utilization rates for each time moment is represented on a vertical axis (or ordinate) of the graph. In another example, the graph (or the timeline) is rendered side-by-side with the heat map associated with the first utilization rates of radio resource over the plurality of subareas of the area of interest. Such a rendering of the graph and the heat map enables to provide the user with location-specific information as well as time-variant information associated with usage of radio resources over the area of interest and the time period of interest. Furthermore, presentation of such information on a same user interface enables easier and convenient analysis thereof by the user.

In an embodiment, the first utilization rate is a time probability and the second utilization rate is a location probability. The time probability enables the user to easily gauge radio resource utilization rates for various subareas associated with the area of interest over the time period of interest. Such a time probability enables a user (such as a business entity associated with an incumbent radio network) to determine geographical areas with most and/or least utilization of radio resources and further, optimize such utilization, for example, by sharing of unused radio resources. Moreover, the time probability enables a user (such as a business entity or a user of a device associated with a licensee radio network) to determine unused radio resources over one or more subareas and utilize such unused radio resources. The location probability enables the user to conveniently determine changes in radio resource utilization rates over the area of interest and the time period of interest. Such changes in radio resource utilization rates can be used by a user (such as a business entity associated with an incumbent radio network) to determine long and short-term trends, seasonal variations and so forth associated with radio resource utilization over the time period of interest and for the area of interest. Moreover, presenting the location probability together with the time probability enables users to compare radio resource utilization for various time moments over the area of interest and for various subareas over the time period of interest.

According to one embodiment, the method comprises receiving an input indicating a frequency range from the user and computing for the frequency range, a third utilization rate of radio resource reservation data over the at least one area of interest and the time period of interest. The computation of the third utilization rate of radio resource reservation data comprises determination of all active radio reservations for the indicated frequency range. Subsequently, the third utilization rate of radio resource reservation data is computed as a ratio of the active radio reservations for different frequency bands within the indicated frequency range and a total number of active radio reservations within the entire indicated frequency range. For example, a user indicates frequency range of 2300-2450 MHz. Furthermore, the entire frequency range between 2300-2450 MHz is associated with 25 active radio reservations. In such an example, the frequency range of 2300-2350 MHz is associated with 10 active reservations and consequently, has a third utilization rate of 10/25 or 0.4; the frequency range of 2350-2400 MHz is associated with 5 active reservations and has a third utilization rate of 5/25 or 0.2; and the frequency range of 2400-2450 MHz is associated with 10 active reservations and has a third utilization rate of 10/25 or 0.4 over the area of interest and the time period of interest. In an embodiment, the third utilization rate is a spectrum probability. Such a spectrum probability enables the user to determine an amount of usage of different frequency bands of the radio spectrum over the area of interest and the time period of interest.

In one embodiment, the method comprises computing for each time moment of the plurality of time moments, a fourth utilization rate by correlating the second utilization rate with the third utilization rate, wherein the fourth utilization rate is a location-spectrum probability, and rendering the fourth utilization rate as a function of time on the user interface. For example, the fourth utilization rate is calculated as a product of the second utilization rate (or the location probability) and the third utilization rate (or the spectrum probability). Furthermore, such a fourth utilization rate associated with the location-spectrum probability is plotted on a graph against time, wherein a horizontal axis (or abscissa) of the graph represents the time period of interest and the vertical axis (or ordinate) represents the fourth utilization rate or (the location-spectrum probability). Moreover, the graph when presented on the user interface along with the first utilization rates of radio resource over the at least one area of interest enables to conveniently provide radio resource utilization data associated with the area of interest, the time period of interest as well as the frequency range on a same user interface to the user.

According to an embodiment, the method comprises computing for the frequency range, a fifth utilization rate by correlating the first utilization rate with the second utilization rate, wherein the fifth utilization rate is a location-time probability, and rendering the fifth utilization rate as a function of the frequency range on the user interface. For example, the first utilization rate of radio resource (or the time probability) is multiplied with the second utilization rate of radio resource (or the location probability) to calculate the fifth utilization rate of radio resource associated with the location-time probability. Furthermore, the location-time probability is plotted on a graph against the indicated frequency range, wherein a horizontal axis (or abscissa) of the graph represents the indicated frequency range and the vertical axis (or ordinate) represents the fifth utilization rate (or the location-time probability). It will be appreciated that such a graph enables to easily represent the radio resource utilization data associated with the area of interest, the time period of interest as well as the frequency range on a same user interface to the user.

In one embodiment, the method comprises computing for the frequency range, a sixth utilization rate by correlating the first utilization rate with the third utilization rate, wherein the sixth utilization rate is a time-spectrum probability, and rendering the sixth utilization rate as a function of the frequency range on the user interface. For example, the first utilization rate of radio resource (or the time probability) is multiplied with the third utilization rate of radio resource (or the spectrum probability) to calculate the sixth utilization rate of radio resource associated with the time-spectrum probability. Furthermore, the time-spectrum probability is plotted on a graph against the indicated frequency range, wherein a horizontal axis (or abscissa) of the graph represents the indicated frequency range and the vertical axis (or ordinate) represents the sixth utilization rate (or the time-spectrum probability).

In an embodiment, the method comprises entering the radio resource reservation data in at least one reservation data unit by at least one user of a radio spectrum administered by the administrative spectrum management system. For example, subsequent to reserving radio resources by at least one user of the radio spectrum, the user is required to enter radio resource reservation data including but not limited to, a username, a reservation area, a time period of reservation, a frequency range, and so forth to the reservation data unit. Alternatively, a device associated with the at least one user is operable to automatically enter the radio resource reservation data in the at least one reservation data unit subsequent to reservation of radio resources by a user associated with the device.

In an example, the method comprises fetching at least one reservation along with the radio resource reservation data substantially at a same time from the administrative spectrum management system. In another example, the method further comprises fetching all reservations along with the radio resource reservation data substantially at a same time from the administrative spectrum management system.

The present disclosure also relates to the system as described above. Various embodiments and variants disclosed above apply mutatis mutandis to the system. According to an embodiment, the controller is also configured to divide the time period of interest into a plurality of time moments; and compute for each time moment of the plurality of time moments, a second utilization rate of radio resource reservation data over the at least one area of interest. The controller can still further or alternatively be configured to render the second utilization rate as a function of time on the user interface. According to yet another embodiment, the first utilization rate is a time probability and the second utilization rate is a location probability.

DETAILED DESCRIPTION OF THE DRAWINGS

Referring to FIG. 1, there is shown a block diagram of a system 100 for presenting geographical radio resource usage information in a user interface 108, in accordance with an embodiment of the present disclosure. The system 100 comprises a controller 102 configured to receive radio resource reservation data including location, time and frequency information representing geographical radio resource reservation data stored in an administrative spectrum management system 104. As shown, the controller 102 is communicatively coupled with the administrative spectrum management system 104. Furthermore, the system 100 comprises a display screen 106 adapted to include the user interface 108 and receive an input indicating selection of at least one area of interest from a user (not shown), wherein the at least one area of interest corresponds to a geographical area. Moreover, the controller 102 is further configured to receive an input indicating a time period of interest from the user; divide the at least one area of interest into a plurality of subareas; calculate for each subarea of the plurality of subareas within the at least one area of interest, a first utilization rate of radio resource over the time period of interest; define a color for each subarea of the plurality of subareas based on the calculated first utilization rate; and render the plurality of subareas with the defined color as a geographical map on the user interface 108.

Figure 2A:
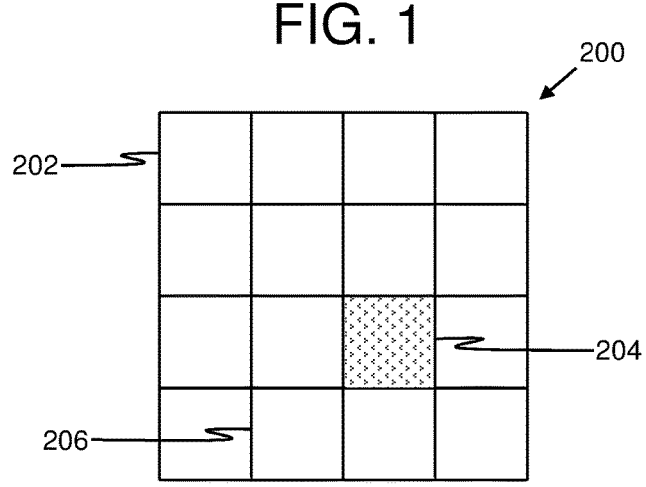
FIGS. 2A-B are illustrations of an area of interest and a corresponding graph of second utilization rate with respect to time, in accordance with an embodiment of the present disclosure.
Figure 2B:
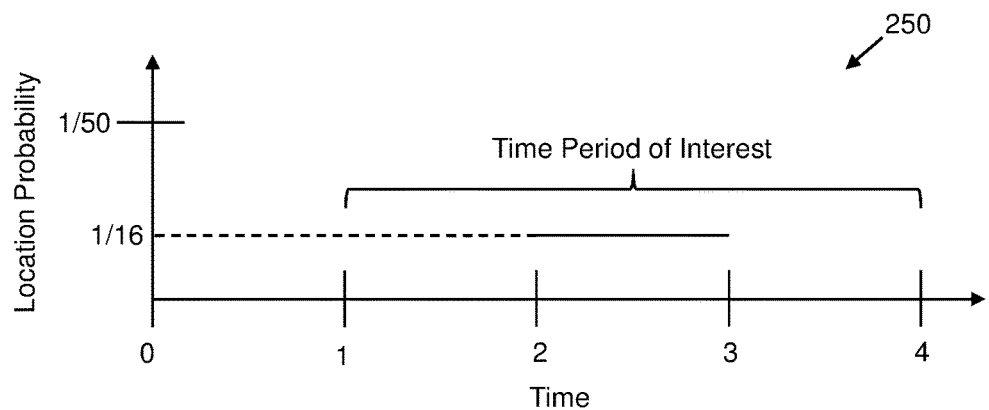

FIGS. 2A-B are illustrations of an area of interest 200 and a corresponding graph 250 of second utilization rate with respect to time, in accordance with an embodiment of the present disclosure. Referring to FIG. 2A, there is shown a schematic illustration of the area of interest 200. As shown, the area of interest 200 is divided into 16 subareas. The time period of interest is associated with 3 arb. units (shown in FIG. 2B). Furthermore, subarea 204 is associated with an active radio reservation of 1 arb. unit. Therefore, the subarea 204 is associated with a first utilization rate (or time probability) of 1/3.

Referring now to FIG. 2B, there is shown a graph 250 corresponding to FIG. 2A, representing the second utilization rate (or location probability) of the area of interest 200 with respect to time. As shown, the second utilization rate is represented on a vertical axis (or ordinate) of the graph 250 and the time period of interest is represented on a horizontal axis (or abscissa) of the graph 250. As shown in FIG. 2A, the area of interest is divided into 16 subareas. Consequently, the second utilization rate (or location probability) of the subarea 204 is 1/16 between time moments 2 and 3.

Figure 3A:
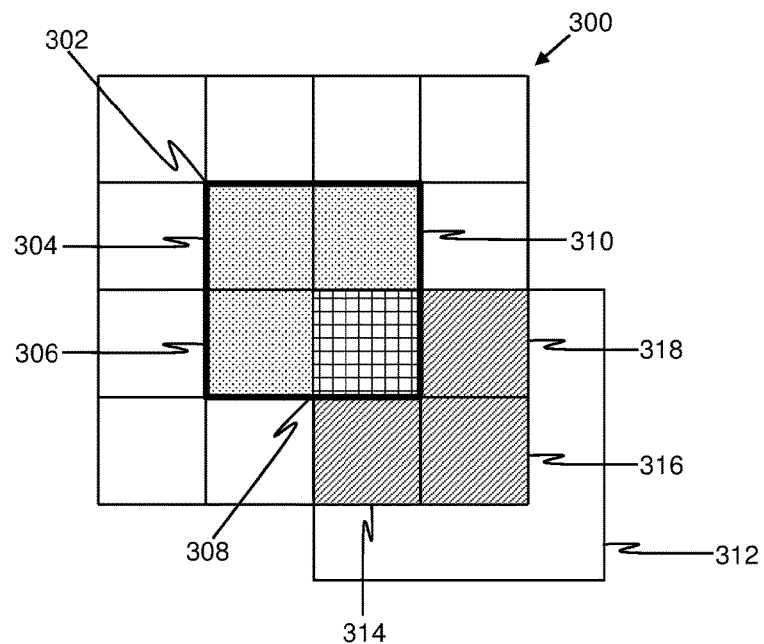
FIGS. 3A-G are illustrations of an area of interest and corresponding graphs, in accordance with various embodiments of the present disclosure.

FIGS. 3A-G are illustrations of an area of interest 300 and corresponding graphs, in accordance with various embodiments of the present disclosure. Referring to FIG. 3A, there is shown a schematic illustration of the area of interest 300. As shown, the area of interest 300 is divided into 16 subareas. Furthermore, the area of interest 300 comprises active radio reservations by a first licensee radio network (RN1) and a second licensee radio network (RN2), over geographical areas 302 and 312 respectively. As shown, the geographical area 302 covers subareas 304, 306, 308 and 310. Furthermore, the geographical area 312 covers subareas 308, 314, 316 and 318. It will be appreciated that the subarea 308 is covered under both the geographical areas 302 and 312. Moreover, a time period of interest is 4 arb. units between time moments 0 and 4. The active radio reservation by the first licensee radio network (RN1) is associated with a time period of 2 arb. units between time moments 1 and 3 and the active radio reservation by the second licensee radio network is associated with a time period of 2 arb. units between time moments 0 and 2. Consequently, a first utilization rate (or time probability) for the area of interest 300 is associated with time period between time moments between 0 and 3, when one or more subareas 302-318 are associated with an active radio reservation. Therefore, the first utilization rate (or time probability) of the area of interest 300 is 3/4. Additionally, the active radio reservation by the first licensee radio network is associated with a first frequency range (F1) of 2 arb. units and the active radio reservation by the second licensee radio network is associated with a second frequency range (F2) of 2 arb. units.

Figure 3B:
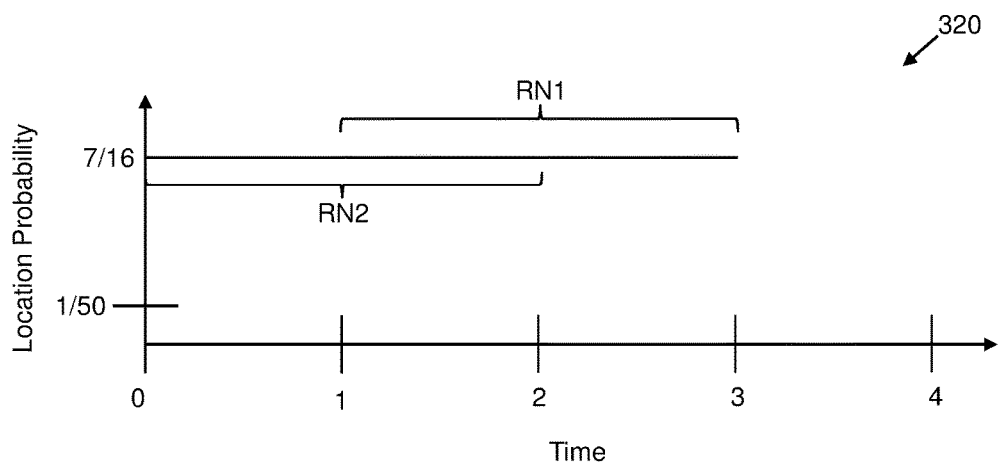

Referring now to FIG. 3B, there is shown a graph 320 corresponding to FIG. 3A, representing a second utilization rate (or location probability) for the area of interest 300 with respect to time. As shown, the second utilization rate of the area of interest 300 is represented on a vertical axis (or ordinate) of the graph 320 and the time is represented on a horizontal axis (or abscissa) of the graph 320. As shown in FIG. 3A, the area of interest is divided into 16 subareas and the geographical areas 302 and 310 cover a total of 7 subareas. Consequently, the second utilization rate (or location probability) of the area of interest 300 is 7/16 in the time period of interest (between time moments 0 and 3).

Figure 3C:
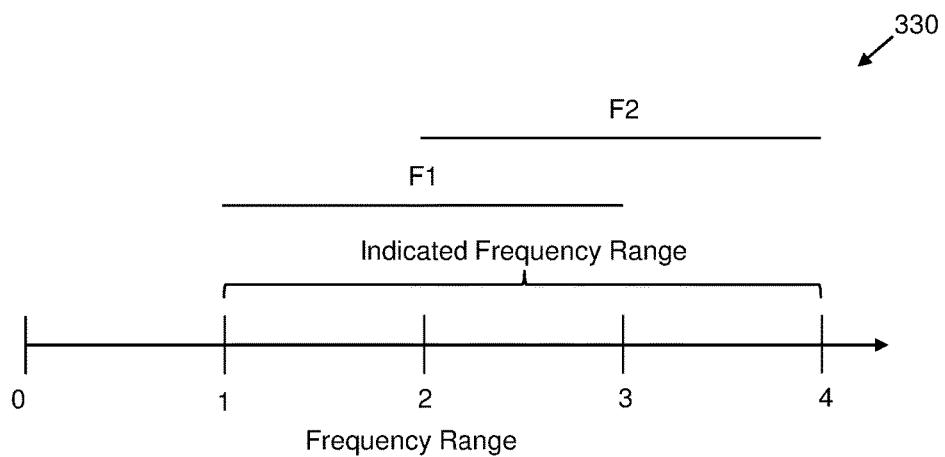

Referring to FIG. 3C, there is shown a graph 330 corresponding to FIG. 3A, illustrating frequency ranges (F1 and F2) associated with active radio reservations of the first licensee radio network (RN1) and the second licensee radio network (RN2). Furthermore, an indicated frequency range is associated with 3 arb. units between frequency bands 1 and 4. As shown, the active radio reservation of the first licensee radio network is associated with the first frequency range (F1) of 2 arb. units (between frequency bands 1 and 3). Moreover, the active radio reservation of the second licensee radio network is associated with the first frequency range (F2) of 2 arb. units between frequency bands 2 and 4.

Figure 3D:
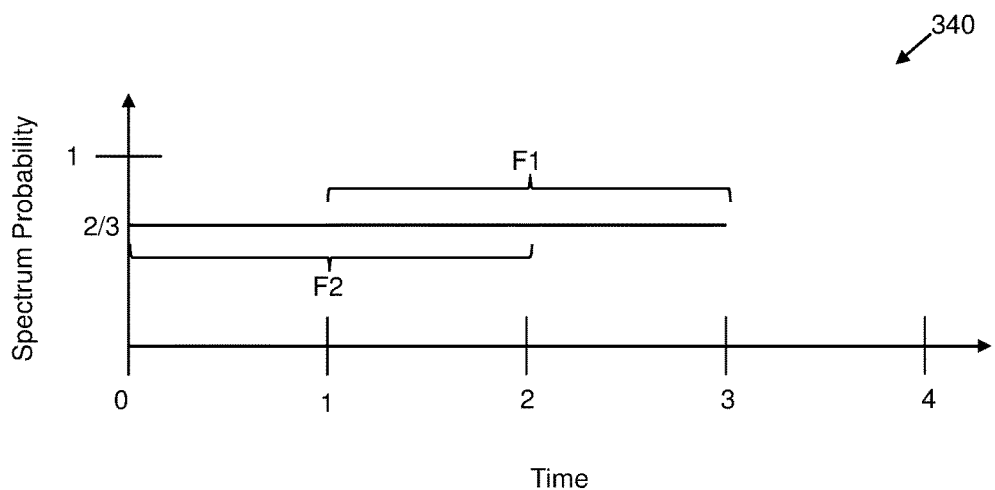

Referring to FIG. 3D, there is shown a graph 340 corresponding to the graph 330 of FIG. 3C, representing a third utilization rate (or spectrum probability) of the area of interest 300 with respect to time. The third utilization rate of the area of interest 300 is represented on a vertical axis (or ordinate) of the graph 340 and the time is represented on a horizontal axis (or abscissa) of the graph 340. As shown, the first frequency range (F1) associated with the first radio network has the third utilization rate (or spectrum probability) of 2/3 between time moments 1 and 3. Furthermore, the second frequency range (F2) associated with the second radio network has the third utilization rate (or spectrum probability) of 2/3 between time moments 0 and 2.

Figure 3E:
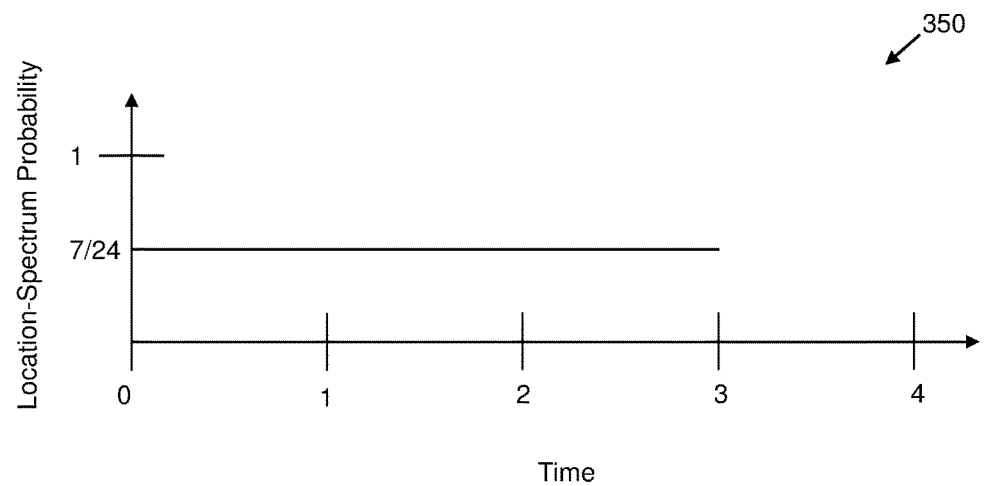

Referring to FIG. 3E, there is shown a graph 350 corresponding to graphs 320 and 340 of FIGS. 3B and 3D respectively, representing a fourth utilization rate (or location-spectrum probability) for the area of interest 300. The fourth utilization rate of the area of interest 300 is represented on a vertical axis (or ordinate) of the graph 350 and the time is represented on a horizontal axis (or abscissa) of the graph 350. As shown, the area of interest 300 is associated with the fourth utilization rate of 7/24 for the time period of interest (between the time moments 0 and 3).

Figure 3F:
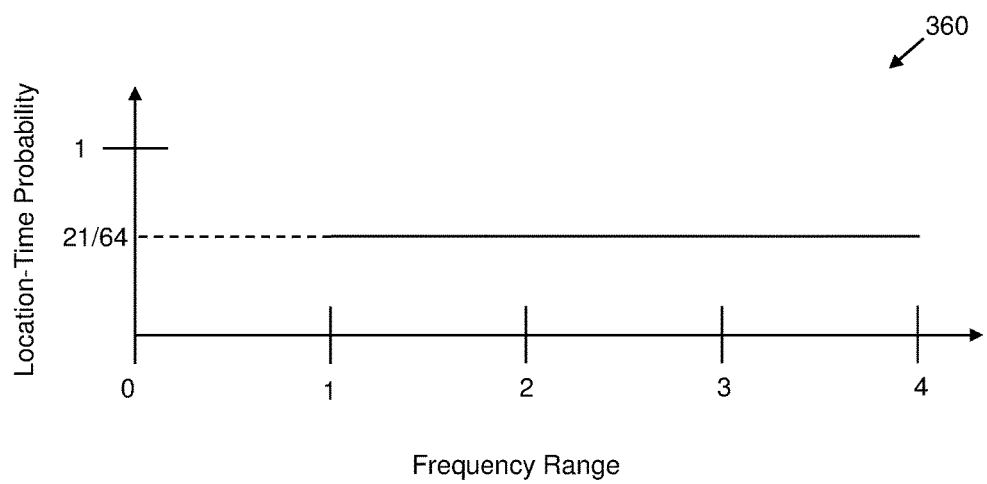

Referring to FIG. 3F, there is shown a graph 360 corresponding to FIG. 3A and the graph 320 of FIG. 3B, representing a fifth utilization rate (or location-time probability) with respect to a frequency range over the area of interest 300. The fifth utilization rate of radio resources in the frequency range is represented on a vertical axis (or ordinate) of the graph 360 and the frequency range is represented on a horizontal axis (or abscissa) of the graph 360. As shown, the area of interest 300 is associated with the fifth utilization rate of 21/64 between frequency bands 1 and 4.

Figure 3G:
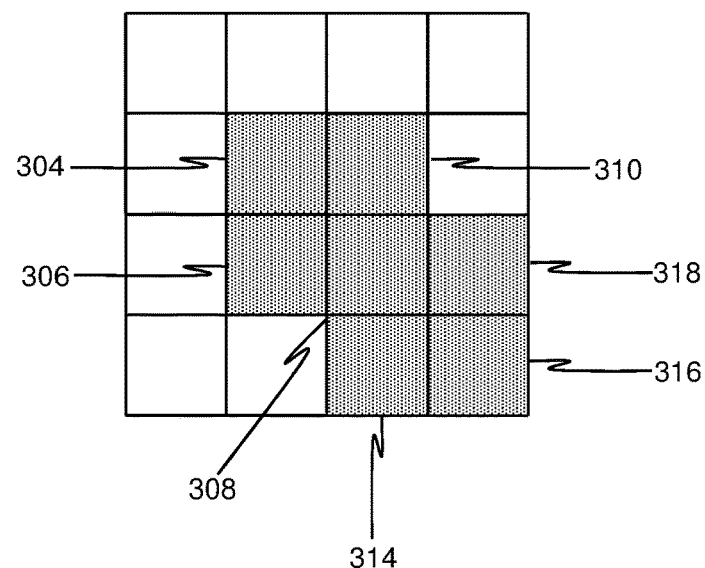

Referring to FIG. 3G, there is shown the area of interest 300 of FIG. 3A and corresponding to the graph 340 of FIG. 3D, representing a time-spectrum probability. As shown, a shaded portion of the area of interest 300, corresponding to subareas 304, 306, 308, 310, 314, 316 and 318, is associated with the first utilization rate in a range of 50-100% (or 3/4) and a non-shaded portion of the area of interest 300 is associated with the first utilization rate in a range of 0-50% (or 0). Consequently, the subareas 304, 306, 308, 310, 314, 316 and 318 are associated with a time-spectrum probability of 1/2.

Figure 4:
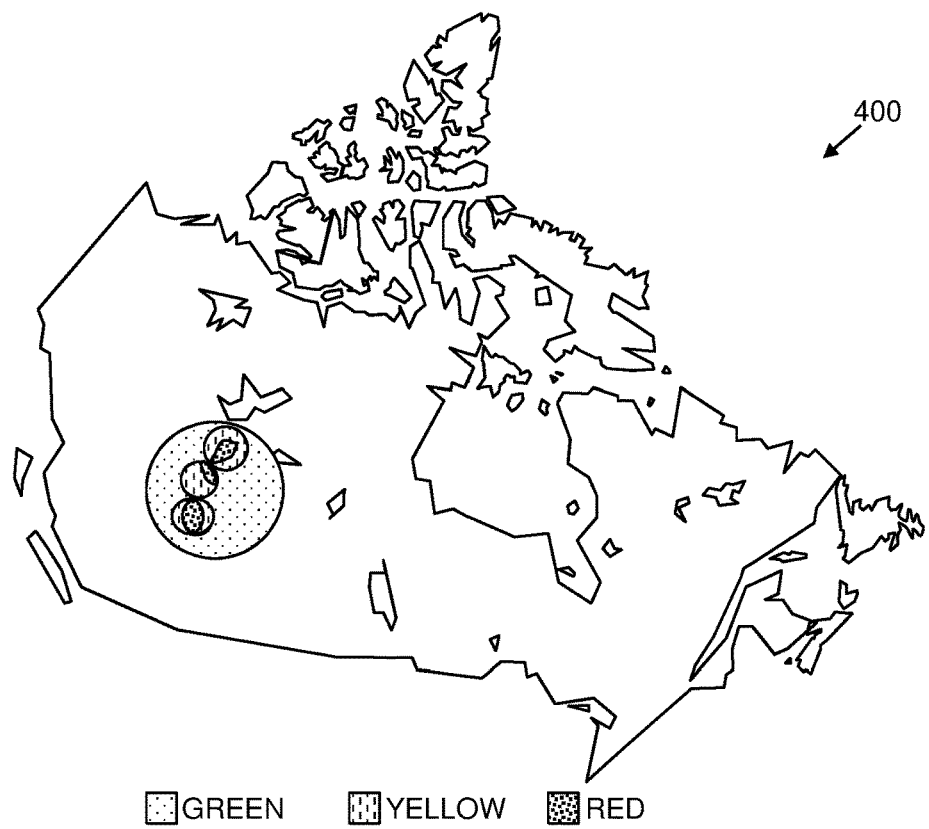
FIG. 4 is a geographical map rendered on a user interface (such as the user interface of FIG. 1), in accordance with an embodiment of the present disclosure.

Referring to FIG. 4, there is shown a geographical map 400 rendered on a user interface (such as the user interface 108 of FIG. 1), in accordance with an embodiment of the present disclosure. As shown, the geographical map 400 comprises a plurality of subareas. Furthermore, a color is defined for the plurality of subareas based on a first utilization rate of radio resources. Furthermore, the plurality of subareas is rendered with the defined colors as the geographical map 400, representing a heat map of the first utilization rate of radio resources on the geographical map 400.

Figure 5:
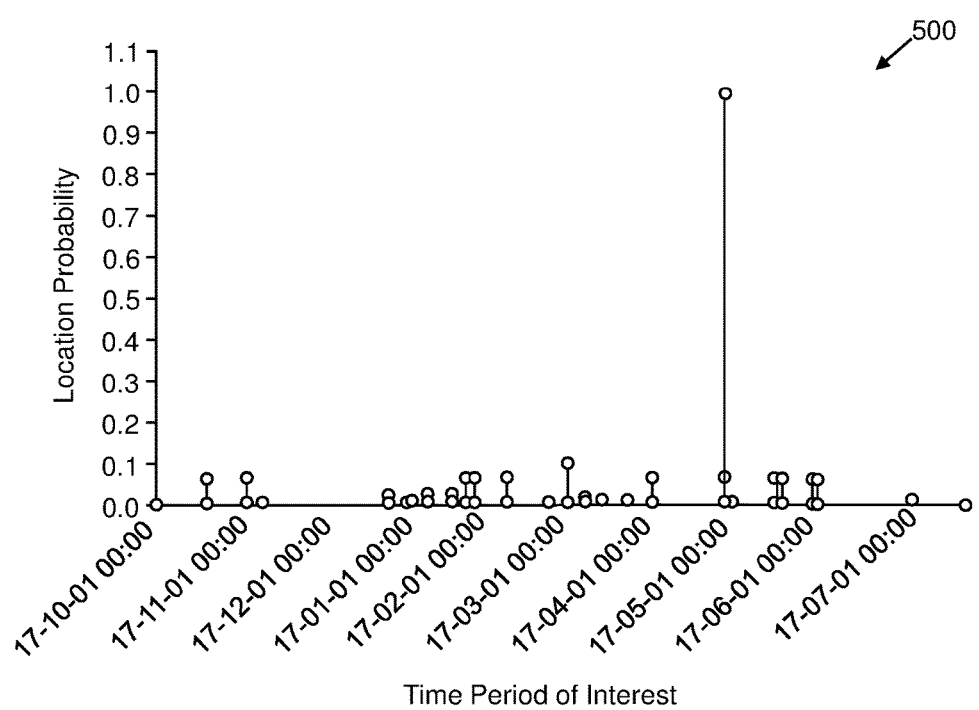
FIG. 5 is a graph rendered on a user interface (such as the user interface of FIG. 1), in accordance with an embodiment of the present disclosure.

Referring to FIG. 5, there is shown a graph 500 rendered on a user interface (such as the user interface 108 of FIG. 1), in accordance with an embodiment of the present disclosure. The graph 500 is a timeline representing a location probability on a vertical axis (or ordinate) of the graph 500 with respect to time period of interest represented on a horizontal axis (or abscissa) of the graph 500. Furthermore, the time period of interest represents time moments associated with $17^{th}$ day of successive months and the, the graph 500 represents a change in the location probability of a geographical area (such as the plurality of subareas shown in FIG. 4) over the time period of interest.

Figure 6:
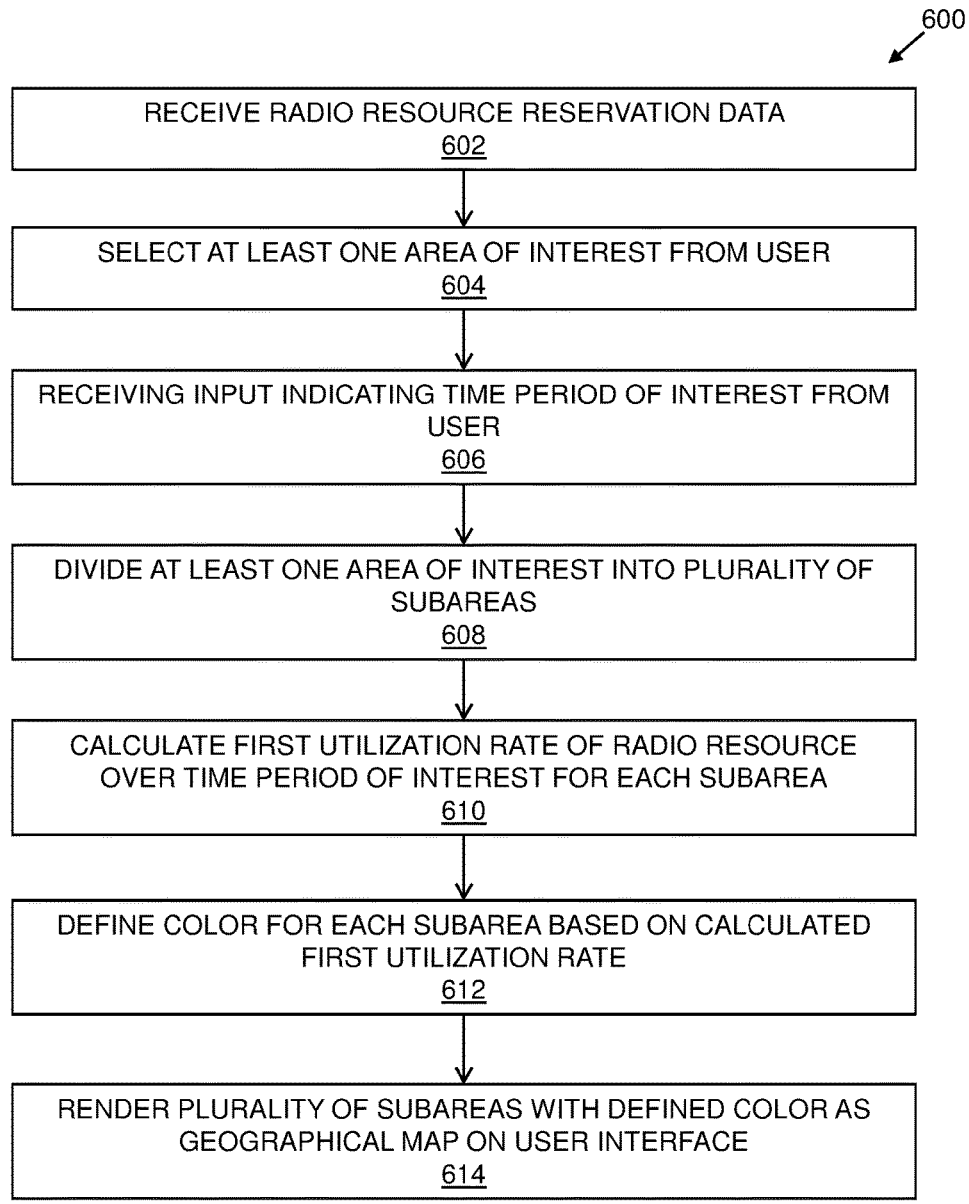
FIG. 6 is an illustration of shown steps of a method for presenting geographical radio resource usage information in a user interface, in accordance with an embodiment of the present disclosure.

Referring to FIG. 6, there are shown steps of a method 600 for presenting geographical radio resource usage information in a user interface, in accordance with an embodiment of the present disclosure. At a step 602, radio resource reservation data is received, the radio resource reservation data including location, time and frequency information representing geographical radio resource reservation data stored in an administrative spectrum management system. At a step 604, at least one area of interest is selected by a user, wherein the at least one area of interest corresponds to a geographical area. At a step 606, an input indicating a time period of interest is received from the user. At a step 608, the at least one area of interest is divided into a plurality of subareas. At a step 610, for each subarea of the plurality of subareas within the at least one area of interest, a first utilization rate of radio resource is calculated over the time period of interest. At a step 612, a color is defined for each subarea of the plurality of subareas based on the calculated first utilization rate. At a step 614, the plurality of subareas with the defined color is rendered as a geographical map on the user interface.

The steps 602 to 614 are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A method executed in a system for presenting geographical radio resource usage information in a user interface of the system, the method comprising executing non-transitory machine readable instructions in a controller of the system for:
   receiving radio resource reservation data including location, time and frequency information representing geographical radio resource reservation data stored in an administrative spectrum management system;
   selecting at least one area of interest from a user, wherein the at least one area of interest corresponds to a geographical area;
   receiving an input indicating a time period of interest from the user;
   dividing the at least one area of interest into a plurality of subareas;
   calculating for each subarea of the plurality of subareas within the at least one area of interest, a first utilization rate of radio resource over the time period of interest;
   defining a color for each subarea of the plurality of subareas based on the calculated first utilization rate; and
   rendering the plurality of subareas with the defined color as a geographical map on the user interface.

2. The method according to claim 1, further comprising:
   dividing the time period of interest into a plurality of time moments; and
   computing for each time moment of the plurality of time moments, a second utilization rate of radio resource reservation data over the at least one area of interest.

3. The method according to claim 1, further comprising rendering the second utilization rate as a function of time on the user interface.

4. The method according to claim 1, wherein the first utilization rate is a time probability and the second utilization rate is a location probability.

5. The method according to claim 1, wherein defining the color for each subarea of the plurality of subareas based on the calculated first utilization rate further comprises:
   defining a first color when the first utilization rate is greater than 0 and lesser than or equal to 1/3 of the highest utilization rate;
   defining a second color when the utilization rate is greater than 1/3 and lesser than or equal to 2/3 of the highest utilization rate;
   defining a third color when the utilization rate is greater than 2/3 of the highest utilization rate.

6. The method according to claim 1, further comprising fetching at least one reservation along with the radio resource reservation data substantially at a same time from the administrative spectrum management system.

7. The method according to claim 1, further comprising fetching all reservations along with the radio resource reservation data substantially at a same time from the administrative spectrum management system.

8. The method according to claim 1, further comprising entering the radio resource reservation data in at least one reservation data unit by at least one user of a radio spectrum administered by the administrative spectrum management system.

9. The method according to claim 1, wherein dividing the at least one area of interest into the plurality of subareas further comprises:
generating a polygon overlay based on intersections of the reservations to create geographical data for the geographical area; and
performing an analysis of the geographical data corresponding to the at least one area of interest to divide the at least one area of interest into the plurality of subareas.

10. The method according to claim 1, further comprising:
receiving an input indicating a frequency range from the user; and
computing for the frequency range, a third utilization rate of radio resource reservation data over the at least one area of interest and the time period of interest.

11. The method according to claim 10, wherein the third utilization rate is a spectrum probability.

12. The method according to claim 1, further comprising:
computing for each time moment of the plurality of time moments, a fourth utilization rate by correlating the second utilization rate with the third utilization rate, wherein the fourth utilization rate is a location-spectrum probability; and
rendering the fourth utilization rate as a function of time on the user interface.

13. The method according to claim 1, further comprising:
computing for the frequency range, a fifth utilization rate by correlating the first utilization rate with the second utilization rate, wherein the fifth utilization rate is a location-time probability; and
rendering the fifth utilization rate as a function of the frequency range on the user interface.

14. The method according to claim 1, further comprising:
computing for each subarea of the plurality of subareas a summed time duration of active radio reservations; and
dividing the summed time duration with the time period of interest.

15. The method according to claim 1, wherein the radio resource reservation data is received from at least one of a national or a regional radio communication agency.

16. A system for presenting geographical radio resource usage information in a user interface, the system comprising:
a controller configured to receive radio resource reservation data including location, time and frequency information representing geographical radio resource reservation data stored in an administrative spectrum management system;
a display screen adapted to include the user interface and receive an input indicating selection of at least one area of interest from a user, wherein the at least one area of interest corresponds to a geographical area;
wherein the controller is further configured to:
receive an input indicating a time period of interest from the user;
divide the at least one area of interest into a plurality of subareas;
calculate for each subarea of the plurality of subareas within the at least one area of interest, a first utilization rate of radio resource over the time period of interest;
define a color for each subarea of the plurality of subareas based on the calculated first utilization rate; and
render the plurality of subareas with the defined color as a geographical map on the user interface.

17. The system according to claim 16, wherein the controller is further configured to:
divide the time period of interest into a plurality of time moments; and
compute for each time moment of the plurality of time moments, a second utilization rate of radio resource reservation data over the at least one area of interest.

18. The system according to claim 16, wherein the controller is further configured to render the second utilization rate as a function of time on the user interface.

19. The system according to claim 16, wherein the first utilization rate is a time probability and the second utilization rate is a location probability.

* * * * *